(12) United States Patent
Ueda et al.

(10) Patent No.: US 8,910,731 B2
(45) Date of Patent: Dec. 16, 2014

(54) MATERIAL HANDLING AND STAIR CLIMBING VEHICLE

(71) Applicant: JTEKT Corporation, Osaka (JP)

(72) Inventors: Takeshi Ueda, Kashiba (JP); Genki Murata, Shiki-gun (JP)

(73) Assignee: JTEKT Corporation, Osaka-shi (JP)

(*) Notice: Subject to any disclaimer, the term of this patent is extended or adjusted under 35 U.S.C. 154(b) by 0 days.

(21) Appl. No.: 14/057,495

(22) Filed: Oct. 18, 2013

(65) Prior Publication Data

US 2014/0116792 A1 May 1, 2014

(30) Foreign Application Priority Data

Oct. 31, 2012 (JP) .................................. 2012-239933

(51) Int. Cl.
*B62D 63/04* (2006.01)
*A61G 5/06* (2006.01)

(52) U.S. Cl.
CPC ................ *B62D 63/04* (2013.01); *A61G 5/061* (2013.01); *A61G 2203/42* (2013.01)
USPC .............................. 180/7.1; 180/6.5; 180/65.8

(58) Field of Classification Search
USPC .......................... 180/7.1, 6.5, 6.48, 65.1, 65.8
See application file for complete search history.

(56) References Cited

U.S. PATENT DOCUMENTS

| | | | | |
|---|---|---|---|---|
| 5,975,225 | A | * | 11/1999 | Kamen et al. .................. 180/7.1 |
| 6,003,624 | A | * | 12/1999 | Jorgensen et al. ............. 180/6.5 |
| 7,426,970 | B2 | * | 9/2008 | Olsen ........................... 180/65.1 |
| 2001/0001992 | A1 | | 5/2001 | Morrell et al. |

* cited by examiner

*Primary Examiner* — Kevin Hurley
(74) *Attorney, Agent, or Firm* — Oblon, Spivak, McClelland, Maier & Neustadt, L.L.P.

(57) ABSTRACT

In a material handling and stair climbing vehicle, when the vehicle is shifted from a state where the wheels with two axles are grounded on a travelling surface to a standing state achieved by the wheels with one axle, a main body portion is turned around support shafts with respect to supporting portions in the two-axle wheel grounded state. Then, an inertial force around the support shafts is generated by reducing the speed of turning of the main body portion with respect to the supporting portions. Then, the vehicle is shifted to the standing state achieved by the wheels with one axle by turning the supporting portions around the axles of the wheels with one axle, which are grounded on the travelling surface, by the inertial force.

4 Claims, 11 Drawing Sheets

MATERIAL HANDLING AND STAIR CLIMBING VEHICLE

INCORPORATION BY REFERENCE

This application claims priority to Japanese Patent Application No. 2012-239933 filed on Oct. 31, 2012 the disclosure of which, including the specification, drawings and abstract, is incorporated herein by reference in its entirety.

BACKGROUND OF THE INVENTION

1. Field of the Invention

The invention relates to a material handling and stair climbing vehicle that advances as wheels with two or more axles relatively revolve.

2. Description of Related Art

For example, US 2001/0001992 A1 describes a stair climbing vehicle that includes a main body portion capable of travelling with the use of four wheels and a material-carrying portion on which an occupant can ride. Axles of front and rear two wheels are turnably supported by respective ends of an arm, the center of the arm is turnably supported by a lower portion of the main body portion, and the material-carrying portion is turnably supported on an upper portion of the main body portion. In such a configuration, when the stair climbing vehicle climbs stairs, a sequence of actions described below is repeatedly performed. Specifically, the main body portion is turned toward the stairs so that the center of gravity of the stair climbing vehicle is shifted toward the stairs, and the arm is turned around the axle of, for example, each front wheel on the stair side (which means each front wheel in the travelling direction). Then, immediately before each rear wheel (which means each rear wheel in the travelling direction) is grounded on a step surface of a first step of the stairs, the main body portion is turned toward the side opposite from the stair side so that the center of gravity is shifted toward the side opposite from the stair side.

When the above-described stair climbing vehicle climbs the stairs, the center of gravity of the stair climbing vehicle is shifted by a large amount. Therefore, the angle of inclination of the main body portion with respect to the step surfaces of the stairs, the inclination being caused due to the turning of the main body portion, becomes large, and the stair climbing vehicle is likely to be unstable when climbing the stairs. Thus, the climbing speed is restricted, and, further, for example, the main body portion may come into contact with the stairs.

SUMMARY OF THE INVENTION

The invention provides a material handling and stair climbing vehicle which advances by being shifted from a two-axle wheel grounded state to a standing state achieved by wheels with one axle and then being shifted from the standing state to the two-axle wheel grounded state, and in which, when the vehicle is shifted from the two-axle wheel grounded state to the standing state, the inclination angle of a main body portion with respect to a travelling surface is limited to a small inclination angle.

According to a feature of an example of the invention, in a material handling and stair climbing vehicle, including: a main body portion; a supporting portion that is disposed at a lower portion of the main body portion, and that supports the main body portion such that the main body portion is turnable around a support shaft; wheels with two or more axles, the wheels being supported at the supporting portion so as to be rotatable about respective axles parallel to the support shaft, and the wheels being disposed such that the wheels are allowed to relatively revolve at different positions with respect to the support shaft by turning the supporting portion with respect to the main body portion; a first turning actuator that relatively turns the wheels with two or more axles and the supporting portion around each of the axles; a second turning actuator that turns the main body portion around the support shaft with respect to the supporting portion; and a control device that advances the main body portion with respect to a travelling surface by driving the first and second turning actuators to shift the material handling and stair climbing vehicle from a state where the wheels with at least two axles among the wheels with two or more axles are grounded on the travelling surface to a standing state achieved by the wheel with any one of the axles, and then shift the material handling and stair climbing vehicle from the standing state to a two-axle wheel grounded state, when the material handling and stair climbing vehicle is shifted from the two-axle wheel grounded state to the standing state, the control device turns the main body portion around the support shaft with respect to the supporting portion in the two-axle wheel grounded state, then generates an inertial force around the support shaft by reducing a speed of turning of the main body portion with respect to the supporting portion, and then shifts the material handling and stair climbing vehicle to the standing state achieved by the wheel with one axle by turning the supporting portion around the axle of the wheel with one axle among the wheels with two axles, which are grounded on the travelling surface, by the inertial force.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Hereinafter, embodiments of the invention will be described with reference to the accompanying drawings.

A material handling and stair climbing vehicle 1 according to an embodiment of the invention will be described with reference to FIG. 1 to FIG. 5. The material handling and stair climbing vehicle 1 according to the embodiment of the invention is applied to an apparatus that is loaded with material (corresponding to "material" in the invention) and that carries the material. Alternatively, the material handling and stair climbing vehicle 1 may be applied to a wheelchair in which an occupant (corresponding to "material" in the invention) is seated. Note that, in the following description, "forward direction" and "rearward direction" refer to directions of travel of the material handling and stair climbing vehicle 1, and "rightward direction" and "leftward direction" refer to directions perpendicular, on a horizontal plane, to the direction of travel when the material handling and stair climbing vehicle 1 is viewed from the rear.

Figure 1:
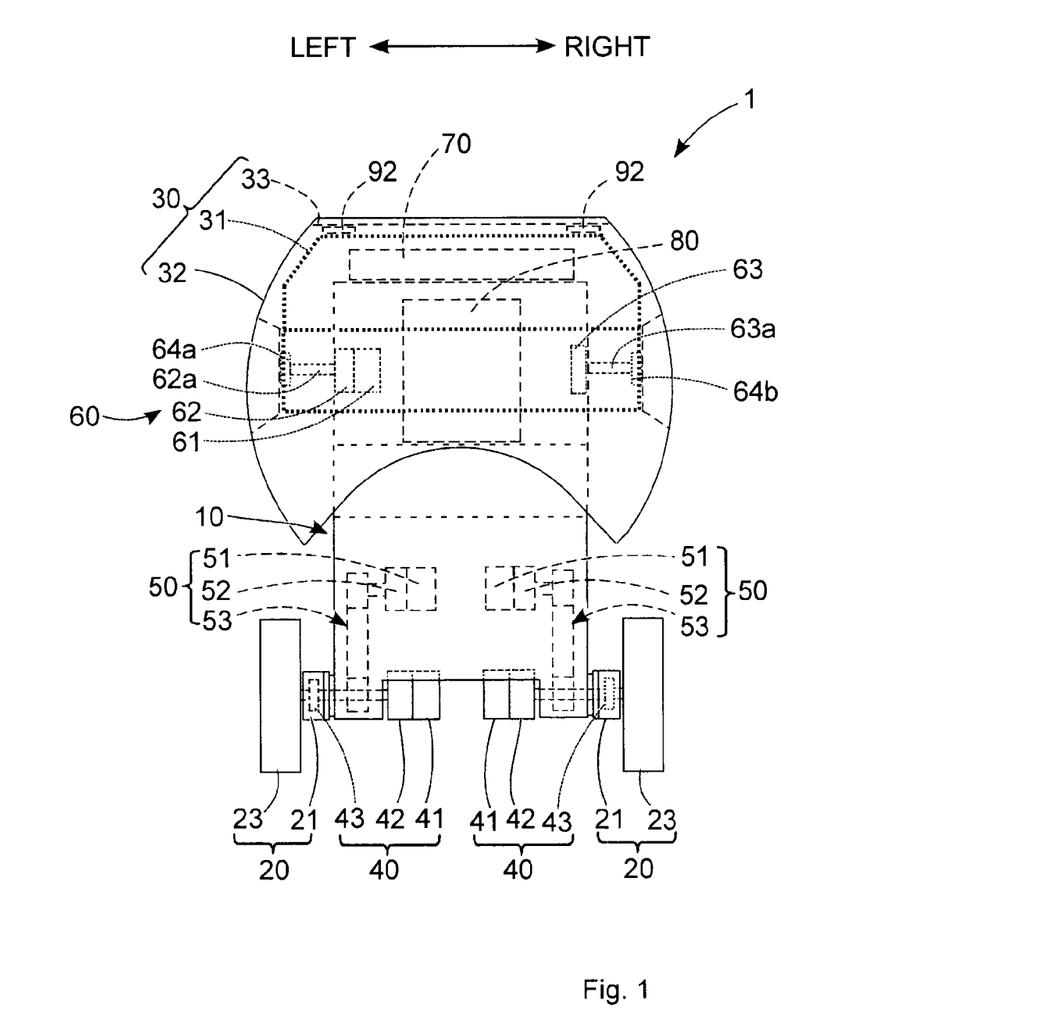
FIG. 1 is a view illustrating a material handling and stair climbing vehicle according to an embodiment of the invention, as viewed from the rear side.
Figure 2:
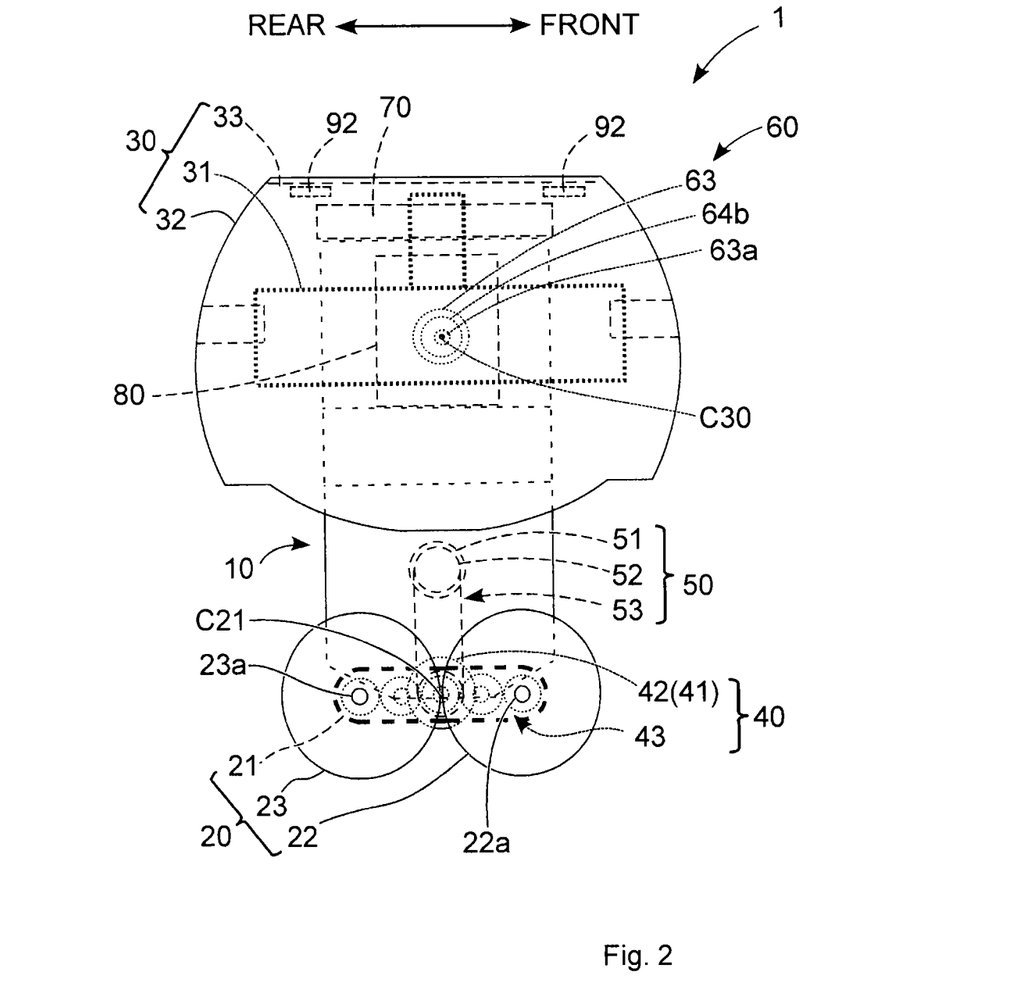
FIG. 2 is a view illustrating the material handling and stair climbing vehicle as viewed from the right side.
Figure 3:
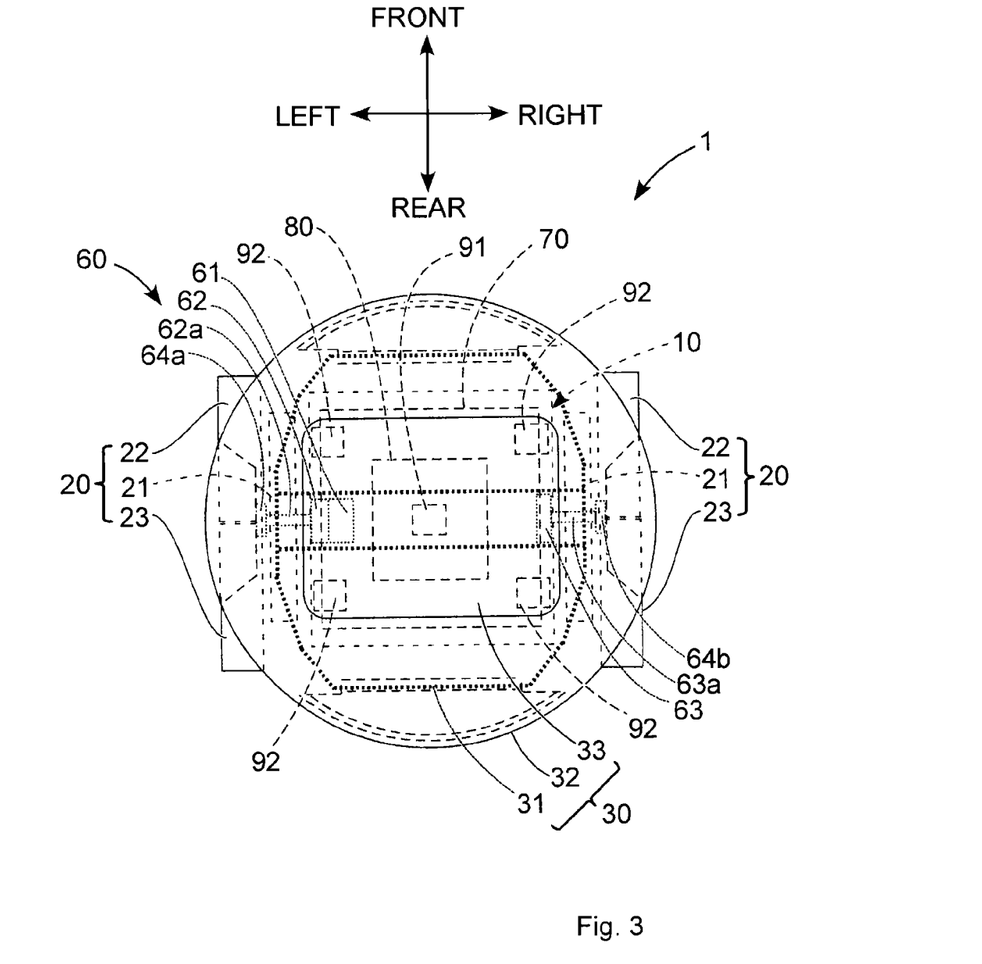
FIG. 3 is a view illustrating the material handling and stair climbing vehicle as viewed from above.

As illustrated in FIG. 1 to FIG. 3, the material handling and stair climbing vehicle 1 includes, for example, a main body portion 10, travelling portions 20, and a material-carrying portion 30. The main body portion 10 is formed into a rectangular parallelepiped shape by, for example, a frame member. The travelling portions 20 are disposed at a lower portion of the main body portion 10, and the material-carrying portion 30 is disposed on an upper portion of the main body portion 10. The travelling portions 20 include a pair of supporting portions 21, a pair of first wheels 22, and a pair of second wheels 23. The travelling portions 20, each including one supporting portion 21, one first wheel 22 and one second wheel 23, are arranged respectively on the right side and the left side of the main body portion 10. Note that, the position of the first wheels 22 and the position of the second wheels 23 are inverted in the travelling direction in some cases. Therefore, in the following description, "front wheel" refers to a wheel located on the front side in the travelling direction and "rear wheel" refers to a wheel located on the rear side in the travelling direction.

The supporting portions 21 are arranged respectively on the right side and the left side of the main body portion 10, and formed into a substantially rectangular parallelepiped shape so as to extend in the front-rear direction in FIG. 1 to FIG. 3. The supporting portions 21 support the main body portion 10 such that the main body portion 10 is relatively turnable around a support shaft C21 (illustrated in FIG. 2) located at the center in the right-left direction of the sheet on which FIG. 2 is drawn.

The first wheel 22 and the second wheel 23 are supported at respective ends (respective ends in the right-left direction of the sheet on which FIG. 2 is drawn) of the supporting portion 21 so as to be rotatable about an axle 22a and an axle 23a (illustrated in FIG. 2), respectively. The directions in which the first wheel 22 and the second wheel 23 are turned with respect to the supporting portion 21 are the same as the direction in which the main body portion 10 is turned with respect to the supporting portion 21. That is, the axle 22a of the first wheel 22 and the axle 23a of the second wheel 23 are parallel to the support shaft C21. Namely, in a case where the supporting portion 21 is turned around the support shaft C21 with respect to the main body portion 10, the first wheel 22 and the second wheel 23 revolve relatively, with respect to the support shaft C21.

As illustrated in FIG. 1 to FIG. 3, the material-carrying portion 30 is formed into a basket shape by, for example, a frame member, and includes, for example, a bracket 31 that is supported so as to be turnable around a material-carrying portion shaft C30 (illustrated in FIG. 2) with respect to the main body portion 10, a generally spherical cover 32 formed so as to cover the periphery of the bracket 31 and fixed to the bracket 31, and a rectangular tray 33 fixed to an upper portion of the cover 32 so as to be loaded with material.

There is provided a pair of first turning actuators 40. The first turning actuators 40 are respectively arranged on the right side and the left side of the main body portion 10. The first turning actuator 40 relatively turns the first wheel 22, the second wheel 23, and the supporting portion 21 of the travelling portion 20 around each of the axles 22a, 23a. The first turning actuator 40 includes, for example, a first motor 41, a first speed reducer 42, and a gear train 43 (refer to FIG. 4).

Figure 4:
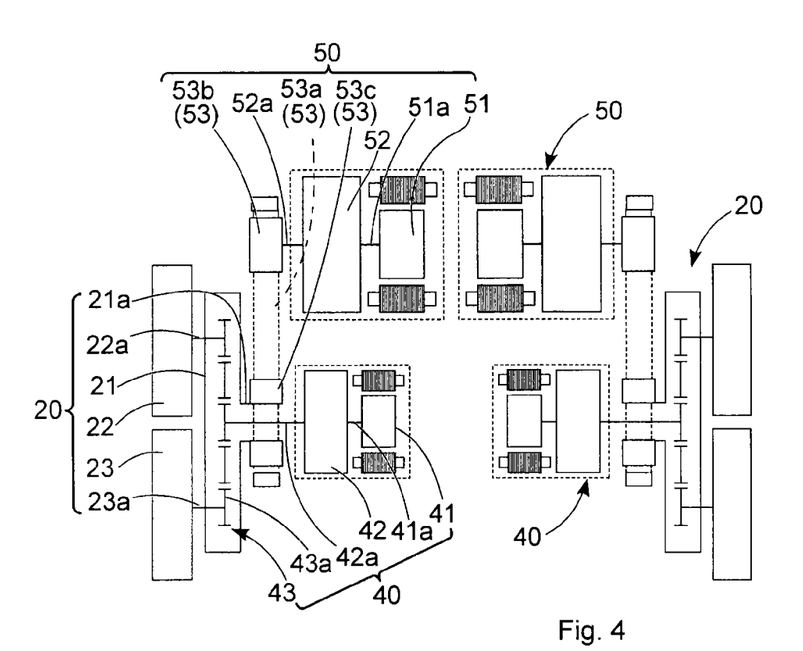
FIG. 4 is a schematic diagram illustrating first and second turning actuators of the material handling and stair climbing vehicle.

The gear train 43 includes five spur gears 43a meshed with each other and arranged side by side, and is turnably supported in the supporting portion 21, as illustrated in FIG. 4. A motor shaft 41a of the first motor 41 disposed at the main body portion 10 is connected to the first speed reducer 42 disposed at the main body portion 10. An output shaft 42a of the first speed reducer 42 is provided so as to pass through a hollow shaft 21a that is formed integrally with a center portion of the supporting portion 21 so as to protrude from the center portion. The spur gear 43a disposed at the center of the gear train 43 is fitted to the output shaft 42a of the first speed reducer 42.

The spur gears 43a disposed at respective ends of the gear train 43 are fitted to the axle 22a of the first wheel 22 and the axle 23a of the second wheel 23, respectively. The hollow shaft 21a of the supporting portion 21 is provided so as to pass through the lower portion of the main body portion 10 with a bearing (not shown) interposed therebetween such that the main body portion 10 and the supporting portion 21 are turnable relative to each other.

As illustrated in FIG. 1, FIG. 2, and FIG. 4, there is provided a pair of second turning actuators 50. The second turning actuators 50 are respectively arranged on the right side and the left side within the main body portion 10. The second turning actuator 50 turns the main body portion 10 around the support shaft C21, with respect to the supporting portion 21. Each second turning actuator 50 includes, for example, a second motor 51, a second speed reducer 52, and a belt mechanism 53. The belt mechanism 53 includes a belt 53a and two pulleys 53b, 53c.

A motor shaft 51a of the second motor 51 disposed in the main body portion 10 is connected to the second speed reducer 52 disposed in the main body portion 10. The pulley 53b is fitted to an output shaft 52a of the second speed reducer 52. Further, the pulley 53c is fitted to the hollow shaft 21a of the supporting portion 21. The belt 53a is looped over the pulley 53b and the pulley 53c.

Further, as illustrated in FIG. 1 to FIG. 3, and FIG. 5, a third turning actuator 60 that turns the material-carrying portion 30 around the material-carrying portion shaft C30 with respect to the main body portion 10 is disposed in the main body portion 10. The third turning actuator 60 includes, for example, a third motor 61, a third speed reducer 62, and a brake 63. The third motor 61 and the third speed reducer 62 are disposed on one of the right side and the left side within the main body portion 10, and the brake 63 is disposed on the other one of the right side and the left side within the main body portion 10.

Figure 5:
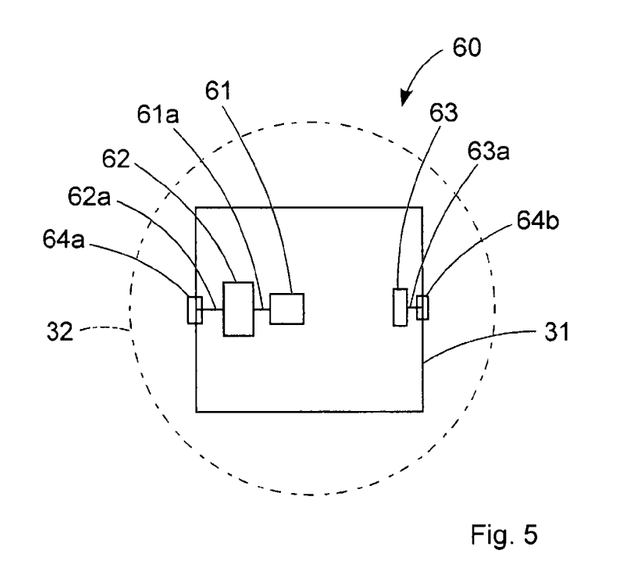
FIG. 5 is a schematic diagram illustrating a third turning actuator of the material handling and stair climbing vehicle.

As illustrated in FIG. 1 and FIG. 5, a motor shaft 61a of the third motor 61 disposed in the main body portion 10 is connected to the third speed reducer 62 disposed in the main body portion 10, and an output shaft 62a of the third speed reducer 62 is fitted to a bearing 64a mounted on one of the right side and the left side of the bracket 31. A brake shaft 63a of the brake 63 is fitted to a bearing 64b mounted on the other one of the right side and the left side of the bracket 31. The brake 63 is provided in order to keep the tray 33 in a horizontal position even after the third motor 61 is turned off.

In addition, as illustrated in FIG. 1 to FIG. 3, a control device 70 that controls operations of, for example, the first, second, and third turning actuators 40, 50, 60, a battery 80 for driving, which supplies electric power to, for example, the first, second, and third turning actuators 40, 50, 60, and electric components such as a servo amplifier (not shown) and a relay (not shown) are fixedly disposed in the main body portion 10. In addition, a sensor capable of directly detecting the position of the material-carrying portion 30 is not mounted in the material handling and stair climbing vehicle 1. There is no sensor that detects, for example, an absolute inclination angle of the material-carrying portion 30, an absolute inclination angle of the main body portion 10, and an absolute inclination angle of the supporting portion 21.

Further, four weight detection sensors 92 that detect the weight of a material placed on the tray 33 are respectively disposed at four corners of the tray 33, between the cover 32 and the tray 33 of the material-carrying portion 30. A damper (not shown) made of, for example, a cushion material is disposed between the cover 32 and the bracket 31 in order to suppress vibration of the tray 33 to prevent the material from dropping from the tray 33.

Figure 6:
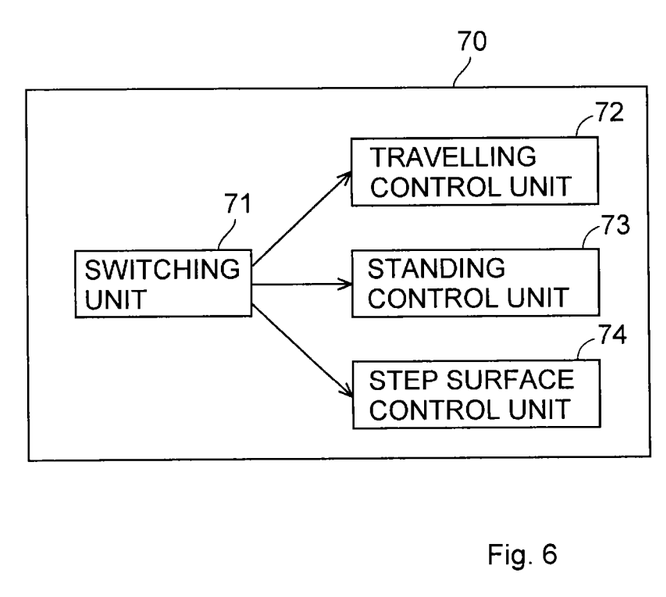
FIG. 6 is a functional block diagram of a control device of the material handling and stair climbing vehicle.

Next, the configuration of the control device 70 will be described with reference to FIG. 6. As illustrated in FIG. 6, the control device 70 includes a switching unit 71, a travelling control unit 72, a standing control unit 73, and a step surface control unit 74. The switching unit 71 makes switchover among control by the travelling control unit 72, control by the standing control unit 73, and control by the step surface control unit 74, depending on the state of the material handling and stair climbing vehicle 1. The details of the process executed by the switching unit 71 will be described later.

The travelling control unit 72, the standing control unit 73, and the step surface control unit 74 will be briefly described below. However, they will be described in detail later along with the description of an operation of the material handling and stair climbing vehicle 1.

The travelling control unit 72 controls travelling of the material handling and stair climbing vehicle 1 in a state where the first wheels 22 and the second wheels 23 are in contact with a travelling surface, and controls the position of the material-carrying portion 30 on the assumption that the supporting portions 21 are not turned with respect to the travelling surface. The standing control unit 73 executes stair climbing control in a standing state achieved by the front wheels, and controls the position of the material-carrying portion 30 on the assumption that the front wheels are positioned. That is, the standing control unit 73 controls a state where one of each first wheel 22 and each second wheel 23 serves as a revolving wheel that revolves around the axle of the other one of each first wheel 22 and each second wheel 23.

The step surface control unit 74 controls the material handling and stair climbing vehicle 1 in a case where each first wheel 22 is placed on a step surface different from a step surface on which each second wheel 23 is placed on, and the wheels 22 or 23 on the upper step are located at a distance from the wall surface of the next step. The step surface control unit 74 moves the wheels 22 or 23 on the upper step until they come into contact with the wall surface of the next step, by turning each supporting portion 21 with respect to the step surface while turning the wheels 22 or 23 on the upper step with respect to the step surface. In addition, the step surface control unit 74 controls the position of the material-carrying portion 30 on the basis of the distance from the wheels 22 or 23 on the upper step to the wall surface of the next step and the rotation angles of the first and second turning actuators 40, 50.

Next, the process executed by the switching unit 71 of the control device 70 and a stair climbing operation performed by the material handling and stair climbing vehicle 1 will be described with reference to FIG. 7 and FIG. 8A to FIG. 8L. Description will be provided on an operation in which the material handling and stair climbing vehicle 1 located on a horizontal travelling step surface Sd (corresponding to "travelling surface") of the stairs climbs onto a step surface Su1 of a first step and a step surface Su2 of a second step under the control of the control device 70. Note that, in FIG. 8A to FIG. 8L, the main body portion 10, the travelling portion 20, and the material-carrying portion 30 of the material handling and stair climbing vehicle 1 are illustrated in simplified models.

Figure 8A:
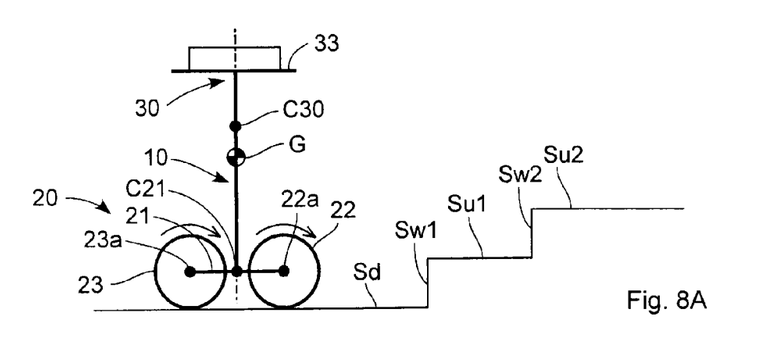
FIG. 8A is a view illustrating a state where the material handling and stair climbing vehicle is travelling under the control by a travelling control unit.

First, as illustrated in FIG. 8A, the material handling and stair climbing vehicle 1 are travelling from the left side toward the right side in the drawings, in a travelling position in which the supporting portion 21 of each travelling portion 20 is in a horizontal position and a resultant center of gravity G of the material handling and stair climbing vehicle 1 and a loaded material is located on a line vertical to the support shaft C21. In this state, the switching unit 71 selects the control by the travelling control unit 72 of the control device 70.

The travelling control unit 72 turns the first wheels 22 and the second wheels 23 in the forward travelling direction (in the clockwise direction in FIG. 8A) by controlling the first motors 41 on the assumption that the supporting portions 21 are not turned with respect to the travelling surface Sd, in order to cause the material handling and stair climbing vehicle 1 to travel. Then, the first wheels 22 and the second wheels 23 are turned in the forward travelling direction with respect to the travelling surface Sd, whereby the material handling and stair climbing vehicle 1 moves forward.

In addition, the travelling control unit 72 controls the positions of the main body portion 10 and the material-carrying portion 30. Note that, the resultant center of gravity G is the resultant of the center of gravity of the material handling with stair climbing vehicle 1 itself, which is figured out in advance, and the center of gravity of the loaded material. The center of gravity of the loaded material can be calculated from the values detected by the weight detection sensors 92. That is, the travelling control unit 72 calculates the resultant center of gravity G on the basis of the values detected by the weight detection sensors 92. In addition, the travelling control unit 72 controls the second and third motors 51, 61 such that the resultant center of gravity G is located on the line vertical to each support shaft C21 and the material-carrying portion 30 is in a horizontal position. In addition, as illustrated in FIG. 8A, the resultant center of gravity G is located on the line vertical to each support shaft C21 when the main body portion 10 and the material-carrying portion 30 are on the same vertical line.

Next, part of the process executed by the switching unit 71 will be described with reference to FIG. 7. In the switching process, whether the control by the travelling control unit 72 is being executed is determined (S1). If it is determined that the control by the travelling control unit 72 is being executed (YES in S1), whether the front wheels have come into contact with a wall surface Sw1 of the first step is determined (S2). Then, if it is determined that the front wheels have not come into contact with the wall surface Sw1 (NO in S2), the control by the travelling control unit is continued (S3). That is, the state in FIG. 8A is continued. On the other hand, if it is determined that the front wheels have come into contact with the wall surface Sw1 (S2: Y), the control is switched to the control by the standing control unit 73 (S4).

Figure 7:
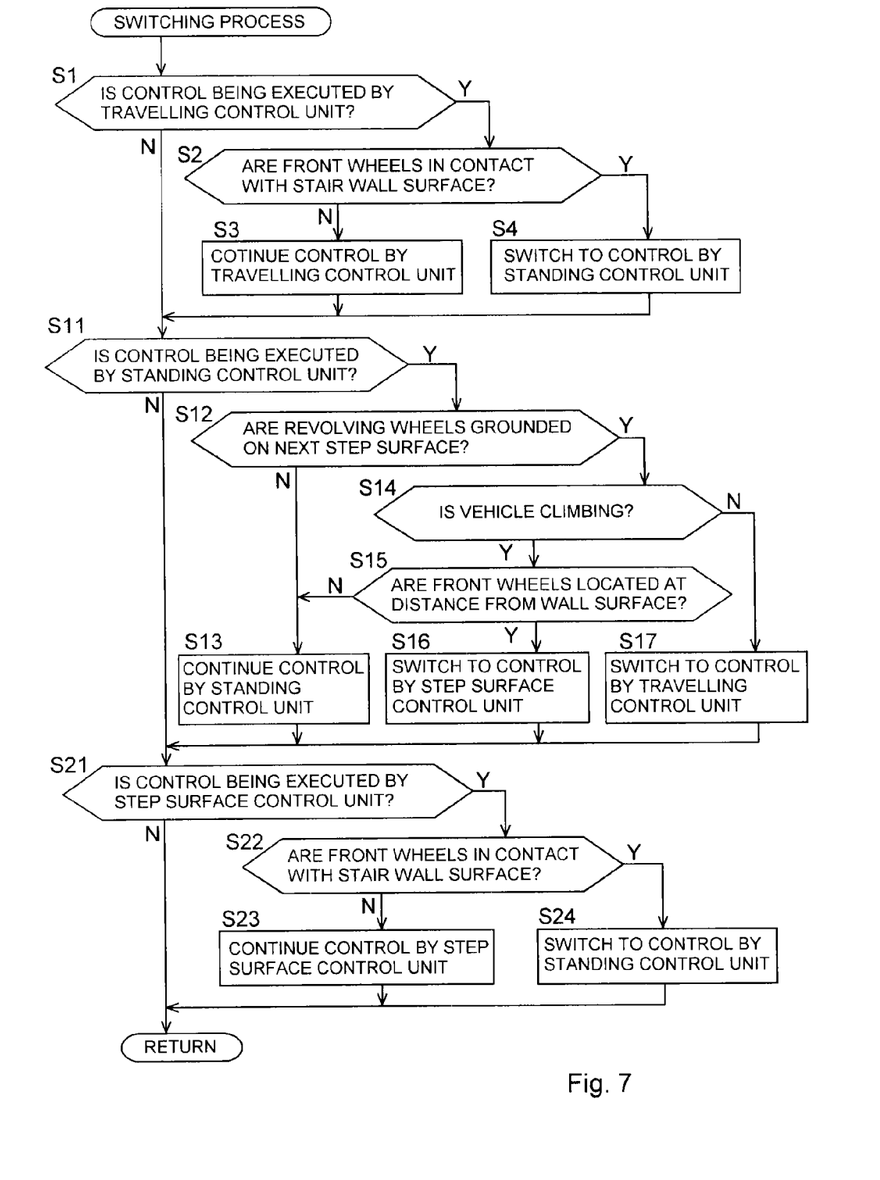
FIG. 7 is a flowchart showing a switching process executed by a switching unit in FIG. 6.
Figure 8B:
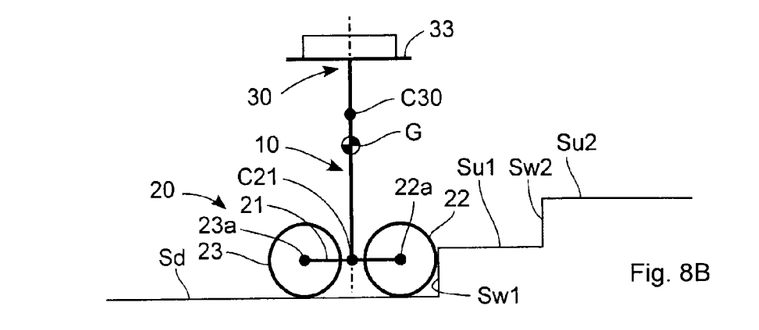
FIG. 8B is a view illustrating a state where front wheels of the material handling and stair climbing vehicle are in contact with a wall surface of a first step, and illustrating a state when the control is switched to the control by a standing control unit.

If the material handling and stair climbing vehicle 1 moves forward from the travelling state illustrated in FIG. 8A, the first wheels 22 come into contact with the wall surface Sw1 of the first step, as illustrated in FIG. 8B. The switching unit 71 makes switchover to the control by the standing control unit 73, as shown in S2 and S4 in FIG. 7.

The contact of the first wheels 22 with the wall surface Sw1 of the first step can be detected by, for example, a pressure sensor provided at the axle 22a of each first wheel 22, or a step detection sensor that detects a step using, for example, infrared light and that is provided on the main body portion 10. Alternatively, the contact of the first wheels 22 with the wall surface Sw1 can be detected by a vehicle speed sensor, or can be detected on the basis of a difference between a command value for each first motor 41 and the rotation angle of the first motor 41.

The control by the standing control unit 73 will be described with reference to FIG. 8C to FIG. 8G. The standing control unit 73 executes the stair climbing control in a standing state achieved by the first wheels 22 that are the front wheels, and controls the positions of the main body portion 10 and the material-carrying portion 30 on the assumption that the first wheels 22 are positioned by the travelling surface Sd and the wall surface Sw1 and are therefore not turned.

Figure 8C:
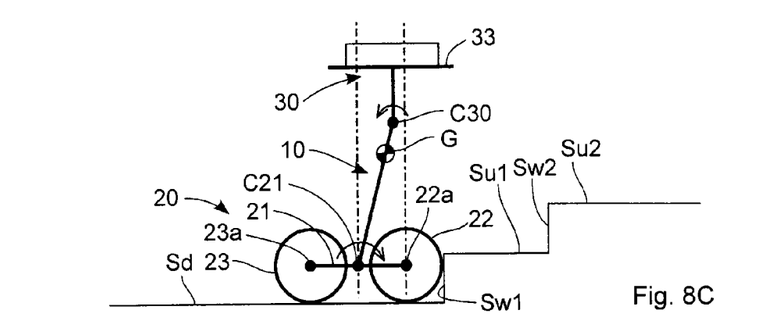
FIG. 8C is a view illustrating a state where the resultant center of gravity is shifted forward from that in the state in FIG. 8B.

The standing control unit 73 keeps the material-carrying portion 30 in a horizontal position by controlling the third motor 61 while tilting the main body portion 10 forward by controlling the second motors 51, as illustrated in FIG. 8C. That is, the second motors 51 turn the main body portion 10 in the clockwise direction with respect to the supporting portions 21, and the third motor 61 turns the material-carrying portion 30 in the counterclockwise direction with respect to the main body portion 10. At this time, the standing control unit 73 controls the second and third motors 51, 61 on the basis of the rotation angles of the second and third motors 51, 61.

Figure 8D:
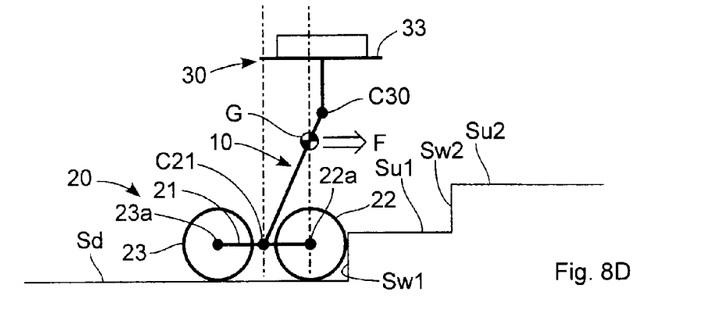
FIG. 8D is a view illustrating a state achieved next to the state in FIG. 8C, and illustrating a state where an inertial force is generated by stopping the turning of a main body portion with respect to supporting portions.

Subsequently, as illustrated in FIG. 8D, when the inclination angle of the main body portion 10 has reached a predetermined inclination angle, the turning of the main body portion 10 with respect to the supporting portions 21 is stopped. As illustrated in FIG. 8D, at the moment when the turning is stopped, the resultant center of gravity G of the entirety of the material handling and stair climbing vehicle 1 loaded with the material is located on a vertical line passing through the axle 22a of each first wheel 22. Alternatively, the resultant center of gravity G may be located behind the vertical line in the travelling direction.

An inertial force F (illustrated in FIG. 8D) around the support shafts C21 is generated by stopping the turning of the main body portion 10 with respect to the supporting portions 21 as described above. The inertial force F is also generated by reducing the speed of turning of the main body portion 10 with respect to the supporting portions 21. However, the maximum inertial force is obtained by the stopping the turning of the main body portion 10.

Figure 8E:
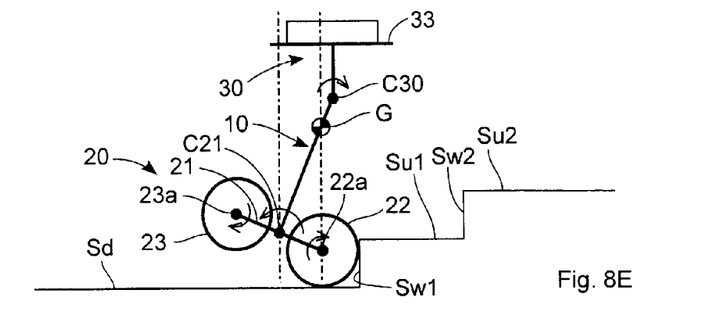
FIG. 8E is a view illustrating a state achieved next to the state in FIG. 8D, and illustrating a state where rear wheels are lifted up from a travelling surface and start revolving.

Then, as illustrated in FIG. 8E, the supporting portions 21 are turned around the axles 22a of the first wheels 22 located on the front side in the vehicle travelling direction, by the inertial force F. That is, the material handling and stair climbing vehicle 1 is shifted to the state (standing state) where the second wheels 23 located on the rear side in the vehicle travelling direction are lifted up from the travelling surface Sd. Then, the second wheels 23 revolve around the axles 22a of the first wheels 22.

At this time, the standing control unit 73 controls the first, second, and third motors 41, 51, 61 on the assumption that the front wheels (the first wheels 22 in FIG. 8E) are positioned. Specifically, the first motors 41 turn the supporting portions 21 in the clockwise direction with respect to the first wheels 22. The second and third motors 51, 61 are controlled on the basis of the rotation angle of the first motor 41 such that the resultant center of gravity G is located on the line vertical to the axle 22a of each first wheel 22 and the material-carrying portion 30 is kept in a horizontal position. That is, the second motors 51 are rotated in the counterclockwise direction and the third motor 61 is rotated in the clockwise direction.

Figure 8F:
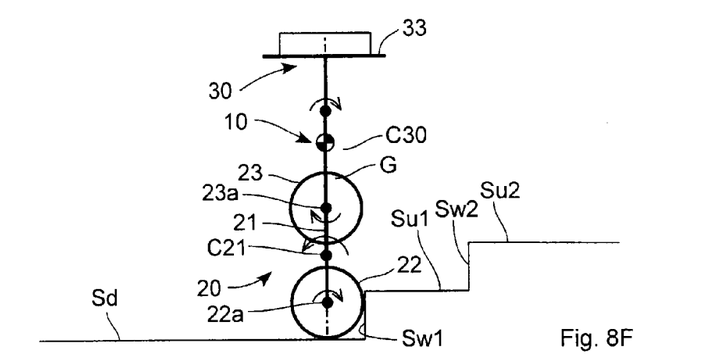
FIG. 8F is a view illustrating a state achieved next to the state in FIG. 8E, and illustrating a state where the revolving wheels have reached a top dead center.
Figure 8G:
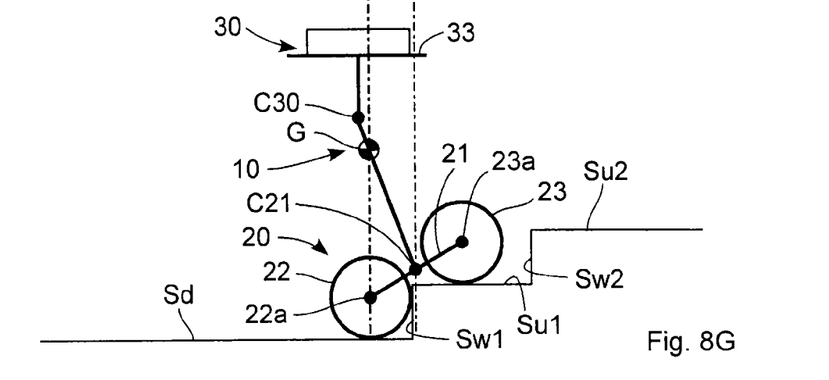
FIG. 8G is a view illustrating a state achieved next to the state in FIG. 8F, and illustrating a state where the revolving wheels are grounded on a step surface of the first step, and illustrating a state when the control is switched to the control by a step surface control unit.

Subsequently, if the control by the standing control unit 73 is continued, as illustrated in FIG. 8F, the second wheels 23, which are the revolving wheels, are located at a top dead center. If the control is further continued, the second wheels 23, which are the revolving wheels, are grounded on the step surface Su1 of the first step, as illustrated in FIG. 8G. The grounding of the second wheels 23, which are the revolving wheels, on the step surface Su1 of the first step can be detected by a method similar to the method used to detect the contact of the first wheels 22, which are the front wheels, with the wall surface Sw1 of the first step as described above.

With reference to FIG. 7, part of the process executed by the switching unit 71 will be described again. During the control by the standing control unit 73, the switching unit 71 executes the process as follows. As shown in FIG. 7, if it is determined that the control is not being executed by the travelling control unit 72 (NO in S1), or after the process in S3 or S4 is executed, whether the control by the standing control unit 73 is being executed is determined (S11). If it is determined that the control by the standing control unit 73 is being executed (YES in S11), whether the revolving wheels have been grounded on the next step surface Su1, as illustrated in FIGS. 8C to 8G, is determined (S12).

If it is determined that the revolving wheels have been grounded on the next step surface Su1 (NO in S12), the control by the standing control unit 73 is continued (S13). On the other hand, if it is determined that the revolving wheels have been grounded on the next step surface Su1 (YES in S12), whether the material handling and stair climbing vehicle 1 is climbing the stairs is determined (S14). If it is determined that the material handling and stair climbing vehicle 1 is climbing the stairs (YES in S14), whether the front wheels that have been grounded on the step surface Su1 of the next step are located at a distance from a wall surface Sw2 of the second step is determined (S15). If it is determined that the front wheels are located at no distance from the wall surface Sw2 (NO in S15), that is, if the front wheels have come into contact with the wall surface Sw2, the control by the standing control unit 73 is continued.

If it is determined that the front wheels are located at a distance from the wall surface Sw2 (YES in S15), the switching unit 71 makes switchover to the control by the step surface control unit 74 (S16). Further, if it is determined in S14 that the material handling and stair climbing vehicle 1 has finished climbing the stairs (NO in S14), the switching unit 71 makes switchover to the control by the travelling control unit 72 (S17).

That is, as illustrated in FIG. 8G, when the second wheels 23, which are the wheels on the first step, are located at a distance from the wall surface Sw2 of the next step in a state where the first wheels 22 and the second wheels 23 have been grounded on the different step surfaces Sd, Su1, respectively, the switching unit 71 makes switchover from the control by the standing control unit 73 to the control by the step surface control unit 74.

The control by the step surface control unit 74 will be described with reference to FIG. 8H to FIG. 8K. The step surface control unit 74 moves the second wheels 23 on the first step until they come into contact with the wall surface Sw2 of the second step, by turning the supporting portions 21 with respect to the step surface Su1 while turning the second wheels 23 on the first step with respect to the step surface Su1. At the same time, the step surface control unit 74 controls the positions of the main body portion 10 and the material-carrying portion 30 on the basis of the distance from the second wheels 23 on the first step to the wall surface Sw2 of the second step and the rotation angles of the first, second, and third motors 41, 51, 61.

Figure 8H:
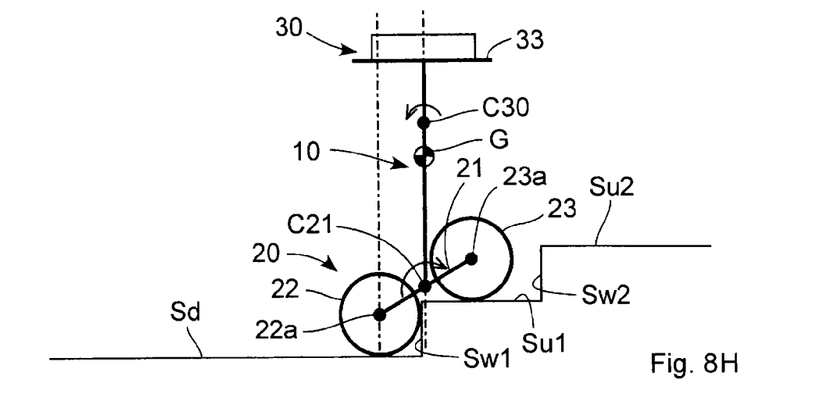
FIG. 8H is a view illustrating a state where the resultant center of gravity is shifted forward from that the state in FIG. 8G.

The step surface control unit 74 keeps the material-carrying portion 30 at a horizontal position by controlling the third motor 61 while tilting the main body portion 10 forward by controlling the second motors 51, as illustrated in FIG. 8H. That is, the second motors 51 turn the main body portion 10 in the clockwise direction with respect to the supporting portions 21, and the third motor 61 turns the material-carrying portion 30 in the counterclockwise direction with respect to the main body portion 10. At this time, the step surface control unit 74 controls the second and third motors 51, 61 on the basis of the rotation angles of the second and third motors 51, 61.

Figure 8I:
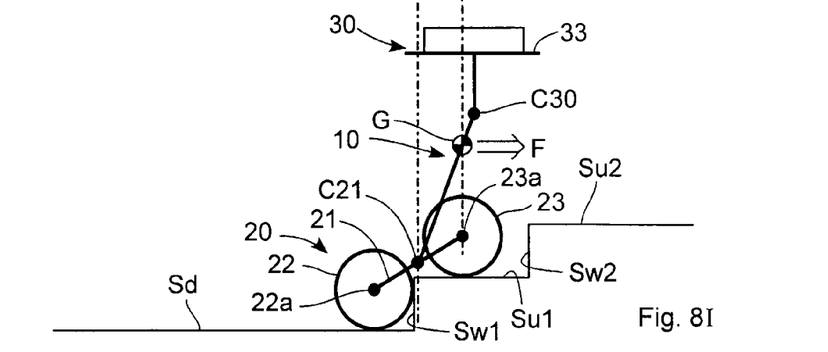
FIG. 8I is a view illustrating a state achieved next to the state in FIG. 8H, and illustrating a state where an inertial force is generated by stopping the turning of the main body portion with respect to the supporting portions.

Subsequently, as illustrated in FIG. 8I, when the inclination angle of the main body portion 10 has reached a predetermined inclination angle, the turning of the main body portion 10 with respect to the supporting portions 21 is stopped. As illustrated in FIG. 8I, at the moment when the turning is stopped, the resultant center of gravity G of the entirety of the material handling and stair climbing vehicle 1 loaded with the material is located on a vertical line passing through the axle 22a of each second wheel 23 on the first step. Alternatively, the resultant center of gravity G may be located behind the vertical line in the travelling direction.

An inertial force F (illustrated in FIG. 8I) around the support shafts C21 is generated by stopping the turning of the main body portion 10 with respect to the supporting portions 21 as described above. The inertial force F is also generated by reducing the speed of turning of the main body portion 10 with respect to the supporting portions 21. However, the maximum inertial force is obtained by the stopping the turning of the main body portion 10.

Figure 8J:
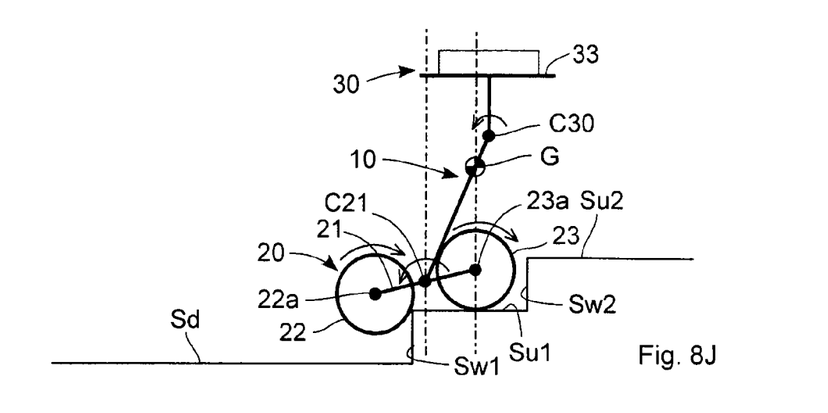
FIG. 8J is a view illustrating a state achieved next to the state in FIG. 8I, and illustrating a state where the wheels on the step surface of the first step are moving forward.

At this time, the second wheels 23 on the first step are not positioned. Therefore, the second wheels 23 on the first step attempt to turn and move forward by the inertial force F. However, the first wheels 22 on the travelling surface cannot move forward because they are in contact with the wall surface Sw1. However, the inertial force F also acts as a force for turning the supporting portions 21 around the axles 23a of the second wheels 23 located on the first step. That is, the material handling and stair climbing vehicle 1 is shifted to the state where the first wheels 23 located on travelling surface Sd are lifted up from the travelling surface Sd. Then, as illustrated in FIG. 8J, the second wheels 23 on the first step are turned and moved forward, and the first wheels 22 on the travelling surface are lifted up along the wall surface Sw1.

Figure 8K:
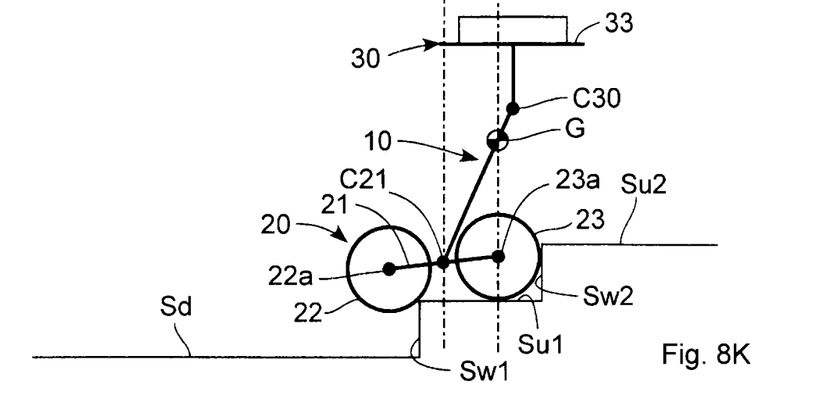
FIG. 8K is a view illustrating a state achieved next to the state in FIG. 8J, and illustrating a state where the wheels on the step surface of the first step come into contact with a wall surface of a second step, and illustrating a state when the control is switched to the control by the standing control unit.

If the control is further continued, as illustrated in FIG. 8K, the second wheels 23, which are the front wheels, come into contact with the wall surface Sw2 of the second step. During a period from the state illustrated in FIG. 8H to the state illustrated in FIG. 8K, the second wheels 23 on the first step move forward and the supporting portions 21 are turned with respect to the step surface Su1. Therefore, it is difficult to figure out the states of the second wheels 23 on the first step and the supporting portions 21 with respect to the step surface Su1.

Therefore, in the state illustrated in FIG. 8H, the material handling and stair climbing vehicle 1 figures out the distance from the second wheels 23 on the first step to the wall surface Sw2. The distance may be measured by, for example, a distance sensor, or may be calculated on the basis of the depth of the steps stored in advance. If the material handling and stair climbing vehicle 1 is used only to climb the stairs, the latter may be adopted.

By figuring out the rotation angles of the first, second, and third motors 41, 51, 61 in addition to the distance, it is possible to predict the positions of the main body portion 10 and the material-carrying portion 30. Therefore, the step surface control unit 74 controls the positions of the main body portion 10 and the material-carrying portion 30 on the basis of the distance and the rotation angles of the first, second, and third motors 41, 51, 61.

Figure 8L:
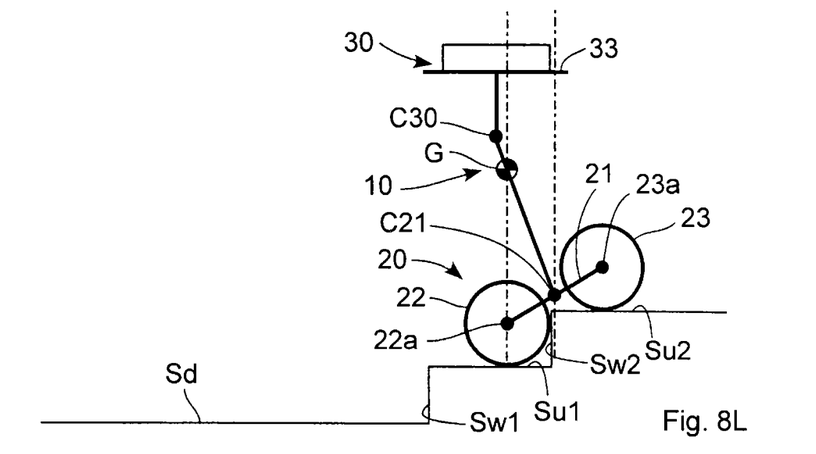
FIG. 8L is a view illustrating a state achieved next to the state in FIG. 8K, and illustrating a state where the revolving wheels are grounded on a step surface of the second step.

After the state in FIG. 8K, a state illustrated in FIG. 8L is achieved under the control executed by the standing control unit 73. That is, the first wheels 22 are grounded on the step surface Su1 of the first step. The control is further continued, and then the stair climbing operation is ended.

With reference to FIG. 7, part of the process executed by the switching unit 71 will be described again. During the control by the step surface control unit 74, the switching unit 71 executes the process as follows. As shown in FIG. 7, if it is determined in S11 that the control by the standing control unit 73 is not being executed (NO in S11) or after the process in S13, S16 or S17 is executed, whether the control by the step surface control unit 74 is being executed is determined (S21). If it is determined that the control by the step surface control unit 74 is being executed (YES in S11), whether the second wheels 23 on the first step, which are the front wheels, have come into contact with the step surface Su2, as illustrated in FIG. 8K, is determined (S22).

If it is determined that the second wheels 23 on the first step, which are the front wheels, have not come into contact with the step surface Su2 (NO in S22), the control by the step surface control unit 74 is continued (S23). On the other hand, if it is determined that the second wheels 23 on the first step, which are the front wheels, have come into contact with the step surface Su2 (YES in S22), the switching unit 71 makes switchover from the control by the step surface control unit 74 to the control by the standing control unit 73 (S24).

With the above-described configuration, even if the absolute inclination angles of the main body portion 10 and the material-carrying portion 30 are not detected with the use of a gyro-sensor or the like, the positions of the main body portion 10 and the material-carrying portion 30 can be controlled under the control by the standing control unit 73 and the control by the step surface control unit 74. Therefore, it is possible to reduce the number of sensors, leading to cost reduction.

In addition, in order to shift the material handling and stair climbing vehicle 1 from the all-wheel grounded state illustrated in FIG. 8B to the standing state, the inertial force F around the support shafts C21, which is generated by stopping (reducing the speed of) the turning of the main body portion 10 with respect to the supporting portions 21, is used. The second wheels 23 on the rear side in the travelling direction are lifted up by the inertial force F. By using the inertial force F, even if the amount of shift of the resultant center of gravity G of the entirety of the material handling and stair climbing vehicle 1 is small, a sufficient force for lifting up the second wheels 23 on the rear side in the travelling direction can be obtained. As a result, when the material handing and stair climbing vehicle 1 climbs the stairs, the angle of inclination of the main body portion 10 with respect to the step surfaces Sd, Su1 of the stairs, the inclination being caused due to the turning of the main body portion 10, can be limited to a small angle.

In particular, by using the inertial force F that is generated by stopping the turning of the main body portion 10 with respect to the supporting portions 21, it is possible to obtain a large inertial force. Therefore, the amount of shift of the resultant center of gravity G of the entirety of the material handling and stair climbing vehicle 1 can be made smaller. In addition, when the inertial force F is generated, the resultant center of gravity G of the entirety of the material handling and stair climbing vehicle 1 loaded with the material is located on the vertical line passing through the axle 22a of each first wheel 22 on the front side in the travelling direction, or behind the vertical line in the travelling direction. Therefore, it is possible to stabilize the standing state.

In the above-described embodiment, the position control is executed without using an inclination angle sensor such as a gyro-sensor. However, even in a material handling and stair climbing vehicle using an inclination angle sensor, lifting up the rear wheels from the step surface using the inertial force F may be adopted when the material handling and stair climbing vehicle is shifted from the all-wheel grounded state to the standing state.

In the above-described embodiment, the material handling and stair climbing vehicle 1 includes the wheels with two axles, which are the first wheels 22 and the second wheels 23. Alternatively, the material handling and stair climbing vehicle 1 may have wheels with three or more axles, which are capable of revolve relatively. In this case, the all-wheel grounded state described above means a state where the wheels with two axles among the wheels with three or more axles are grounded on the travelling surface, and the standing state means a standing state achieved by the wheels with one axle among the wheels with three or more axles.

In the material handling and stair climbing vehicle including the wheels with three or more axles, by shifting the vehicle from the two-axle wheel grounded state to the standing state and then shifting the vehicle from the standing state to the two-axle wheel grounded state, in substantially the same manner as described the above, the wheels with three or more axles are sequentially grounded on the step surfaces of the steps. Thus, the material handling and stair climbing vehicle climbs the stairs.

In addition, it goes without saying that the configuration including the wheels with three or more axles may be applied to a material handling vehicle other than a stair climbing vehicle.

What is claimed is:

1. A material handling and stair climbing vehicle, comprising:
    a main body portion;
    a supporting portion that is disposed at a lower portion of the main body portion, and that supports the main body portion such that the main body portion is turnable around a support shaft;
    wheels with two or more axles, the wheels being supported at the supporting portion so as to be rotatable about respective axles parallel to the support shaft, and the wheels being disposed such that the wheels are allowed to relatively revolve, at different positions, with respect to the support shaft by turning the supporting portion with respect to the main body portion;
    a first turning actuator that relatively turns the wheels with two or more axles and the supporting portion around each of the axles;
    a second turning actuator that turns the main body portion around the support shaft with respect to the supporting portion; and
    a control device that advances the main body portion with respect to a travelling surface by driving the first and second turning actuators to shift the material handling and stair climbing vehicle from a state where the wheels with at least two axles among the wheels with two or more axles are grounded on the travelling surface to a standing state achieved by the wheel with the other one of the axles, and then shift the material handling and stair climbing vehicle from the standing state to a two-axle wheel grounded state,
    wherein when the material handling and stair climbing vehicle is shifted from the two-axle wheel grounded state to the standing state,
    the control device
    turns the main body portion around the support shaft with respect to the supporting portion in the two-axle wheel grounded state,
    then generates an inertial force around the support shaft by reducing a speed of turning of the main body portion with respect to the supporting portion, and
    then shifts the material handling and stair climbing vehicle to the standing state achieved by the wheel with the one axle by turning the supporting portion around the axle of the wheel with the one axle among the wheels with two axles, which are grounded on the travelling surface, by the inertial force.

2. The material handling and stair climbing vehicle according to claim 1, wherein the inertial force is generated by stopping the turning of the main body portion with respect to the supporting portion.

3. The material handling and stair climbing vehicle according to claim 2, wherein at a moment when the turning of the main body portion with respect to the supporting portion is stopped to generate the inertial force,
a resultant center of gravity of an entirety of the material handling and stair climbing vehicle is located on a vertical line passing through the axle of the wheel with one axle, which is located on a front side in a travelling direction, among the wheels with two axles, which are grounded on the travelling surface, or located behind the vertical line in the travelling direction.

4. The material handling and stair climbing vehicle according to claim 3, wherein the resultant center of gravity of the entirety of the material handling and stair climbing vehicle is a resultant center of gravity of the material handling and stair climbing vehicle loaded with a material.

* * * * *